US009710150B2

(12) United States Patent
Tilak et al.

(10) Patent No.: US 9,710,150 B2
(45) Date of Patent: Jul. 18, 2017

(54) SYSTEM AND METHOD FOR CONTEXT-BASED TOUCH PROCESSING

(71) Applicant: QUALCOMM Incorporated, San Diego, CA (US)

(72) Inventors: Raghukul Tilak, San Diego, CA (US); Suhail Jalil, San Diego, CA (US); Louis Dominic Oliveira, San Diego, CA (US); Fariborz Pourbigharaz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 14/149,411

(22) Filed: Jan. 7, 2014

(65) Prior Publication Data

US 2015/0193031 A1 Jul. 9, 2015

(51) Int. Cl.
*G06F 3/0488* (2013.01)
*G06F 1/32* (2006.01)
*G06F 3/041* (2006.01)

(52) U.S. Cl.
CPC .......... *G06F 3/0488* (2013.01); *G06F 1/3262* (2013.01); *G06F 3/0416* (2013.01); *Y02B 60/32* (2013.01)

(58) Field of Classification Search
CPC ........ G06F 3/0416; G06F 3/044; G06F 3/045; G06F 3/04886; G06F 1/3262; G06F 1/3278; G06F 1/3287; G06F 3/041; G06F 1/3203; G06F 1/3234; G06F 2203/048
See application file for complete search history.

(56) References Cited

U.S. PATENT DOCUMENTS

| | | |
|---|---|---|
| 5,565,894 A | 10/1996 | Bates et al. |
| 6,459,424 B1 | 10/2002 | Resman |
| 6,492,979 B1 | 12/2002 | Kent et al. |
| 7,180,508 B2 | 2/2007 | Kent et al. |
| 7,997,132 B2 | 8/2011 | Ross, Jr. et al. |
| 8,181,874 B1 | 5/2012 | Wan et al. |
| 8,294,687 B1 | 10/2012 | Ksondzyk |
| 8,319,746 B1 | 11/2012 | Ho et al. |
| 8,615,221 B1 | 12/2013 | Cosenza et al. |
| 8,754,746 B2 | 6/2014 | Lukas et al. |
| 9,013,855 B2 | 4/2015 | Rothkopf |
| 9,262,182 B2 | 2/2016 | Mullens et al. |
| 2004/0061687 A1 | 4/2004 | Kent et al. |

(Continued)

FOREIGN PATENT DOCUMENTS

| | | |
|---|---|---|
| EP | 2275907 A2 | 1/2011 |
| EP | 2515215 A1 | 10/2012 |

OTHER PUBLICATIONS

International Search Report and Written Opinion—PCT/US2015/010169—ISA/EPO—Mar. 30, 2015.

*Primary Examiner* — Nelson Rosario
(74) *Attorney, Agent, or Firm* — Knobbe, Martens, Olson & Bear, LLP

(57) ABSTRACT

Systems and methods for context-based touch-sensing and processing are disclosed. The energy-efficiency of a touch sensitive device may be improved by dynamically adjusting the function of the touch sensitive surface in real-time based on contextual information such as expected QoS, expected user input in defined regions-of-interest of the touch sensitive surface, and usage modalities of the touch sensitive device.

17 Claims, 5 Drawing Sheets

(56) References Cited

U.S. PATENT DOCUMENTS

| | | |
|---|---|---|
| 2006/0223547 A1 | 10/2006 | Chin et al. |
| 2008/0303782 A1* | 12/2008 | Grant et al. .................. 345/156 |
| 2008/0309631 A1* | 12/2008 | Westerman ........... G06F 1/3203 |
| | | 345/173 |
| 2009/0251434 A1 | 10/2009 | Rimon et al. |
| 2009/0301190 A1 | 12/2009 | Ross, Jr. et al. |
| 2010/0153313 A1 | 6/2010 | Baldwin et al. |
| 2010/0265209 A1* | 10/2010 | Nurmi et al. ................. 345/174 |
| 2011/0012840 A1 | 1/2011 | Hotelling et al. |
| 2011/0118026 A1 | 5/2011 | Lukas et al. |
| 2011/0193809 A1 | 8/2011 | Walley et al. |
| 2011/0210942 A1 | 9/2011 | Kitamori et al. |
| 2011/0261005 A1 | 10/2011 | Joharapurkar et al. |
| 2011/0304550 A1 | 12/2011 | Romera et al. |
| 2012/0050229 A1 | 3/2012 | Tenuta et al. |
| 2012/0068958 A1 | 3/2012 | Chen |
| 2012/0176343 A1 | 7/2012 | Holmgren et al. |
| 2012/0268378 A1* | 10/2012 | Tokutake .............. G06F 3/0416 |
| | | 345/168 |
| 2013/0002531 A1 | 1/2013 | Krahenbuhl et al. |
| 2013/0021303 A1 | 1/2013 | Martin et al. |
| 2013/0050132 A1 | 2/2013 | Calpe et al. |
| 2013/0069897 A1 | 3/2013 | Liu et al. |
| 2013/0141346 A1 | 6/2013 | Oh |
| 2013/0181951 A1 | 7/2013 | Klinghult et al. |
| 2013/0265243 A1* | 10/2013 | Law .............................. 345/173 |
| 2013/0265276 A1* | 10/2013 | Obeidat et al. ............... 345/174 |
| 2013/0335338 A1 | 12/2013 | Lai et al. |
| 2014/0120891 A1 | 5/2014 | Chen et al. |
| 2014/0197698 A1 | 7/2014 | Rothkopf |
| 2014/0204035 A1* | 7/2014 | Chang .......................... 345/173 |
| 2015/0193070 A1 | 7/2015 | Tilak et al. |
| 2015/0370410 A1 | 12/2015 | Sauer et al. |
| 2016/0062494 A1 | 3/2016 | Zuber et al. |

\* cited by examiner

SYSTEM AND METHOD FOR CONTEXT-BASED TOUCH PROCESSING

TECHNICAL FIELD

The systems and methods disclosed herein relate generally to touch-sensing devices, and more particularly, to touch-sensitive user interfaces for electronic devices and systems.

BACKGROUND

Advances in technology have resulted in smaller and more powerful computing devices. For example, there currently exist a variety of portable computing devices, including wireless computing devices such as wireless telephones, personal digital assistants (PDAs), and tablet computers that are small, lightweight, and easily carried by users. In order to simplify user interfaces and to avoid pushbuttons and complex menu systems, such portable computing devices may use touch screen displays that detect user gestures on the touch screen and translate the detected gestures into commands to be performed by the device. Such gestures may be performed using one or more fingers or a stylus type pointing implements in contact with or in close proximity to a sensing surface. The term Quality-of-Service (QoS) is collectively used to represent several properties of touch screen implementations such as position update rate, accuracy of determined touch position, touch position determination resolution, the maximum number of objects tracked simultaneously, the cross-sectional size of tracked objects, usage modalities such as contact or contact-less operation, detection sensitivity, etc.

Due to the coarse cross-section of an average human finger, finger-based touch input can be used for operating coarse controls on the user interface, such as selecting an item or pressing a button. Such finger-based use cases require only low Quality of Service (QoS). Use cases such as on-screen drawing, calligraphy, or handwriting capture for example, require a fine-tipped input tool or stylus to allow the touch sensitive surface to capture finer movements. Such stylus-based use cases require a much higher QoS. Existing touch processing implementations intended to support applications requiring high QoS are statically configured to operate continuously at a high QoS even when the current application does not support stylus input. Since higher QoS translates to high energy consumption, such static implementations are not energy efficient. Due to the latest trend in mobile computing and communication devices having large display sizes, varied applications boast different modes (finger, stylus, and proximity) of touch-based human interfaces and use-cases. The resulting complexity of the touch sensing implementation means that touch processing is increasingly threatening battery life while delivering sub-optimal user experience most of the time.

SUMMARY

Aspects of the disclosure relate to systems and methods for improving the energy efficiency and related user experience of electronic devices such as mobile phones, tablets, and laptop computers employing touch screen based user input methods. In most aspects, user experience and overall energy-efficiency are improved by dynamically adjusting the QoS and in turn, function, of the touch screen sensor in real time, based on contextual information. Contextual information may include identifying which tool (for example, a user's finger or a stylus) is used to provide input on the touch sensitive surface and determining the desired QoS specified by applications currently using the touch screen to interact with the user. Contextual information may also include defining QoS differentiated regions of the physical touch screen sensor to have varied levels of QoS requirements, depending on the current application.

In one aspect, a touch-sensitive display system for an electronic device includes a touch-sensitive display. The display system also includes a control module configured to determine an expected touch screen input method, determine an expected input region, and adjust a sensitivity of a touch sensitive surface based on the expected touch screen input method and expected input region.

In another aspect, a method for improving the energy efficiency of touch-sensing devices includes the steps of determining an expected touch screen input method and dynamically adjusting a sensitivity of a touch sensitive surface based on the expected touch screen input method.

In yet another aspect, a method for improving the energy efficiency of touch-sensing devices includes the steps of determining touch sensitive surface logical regions of interest, determining an expected touch screen input method for each logical region of interest, and adjusting touch sensitive surface sensitivity for each logical region of interest based on the expected touch screen input method for each region of interest.

In a further aspect, a non-transitory computer-readable medium includes instructions that, when executed, causes a processor to perform the method of determining an expected touch screen input method and adjusting a sensitivity of a touch sensitive surface based on the expected touch screen input method.

In another aspect, an apparatus for energy efficient touch processing includes a touch-sensitive display, means for determining an expected touch screen input method, means for determining an expected input region, and means for adjusting a sensitivity of a touch sensitive surface based on the expected touch screen input method and expected input region.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
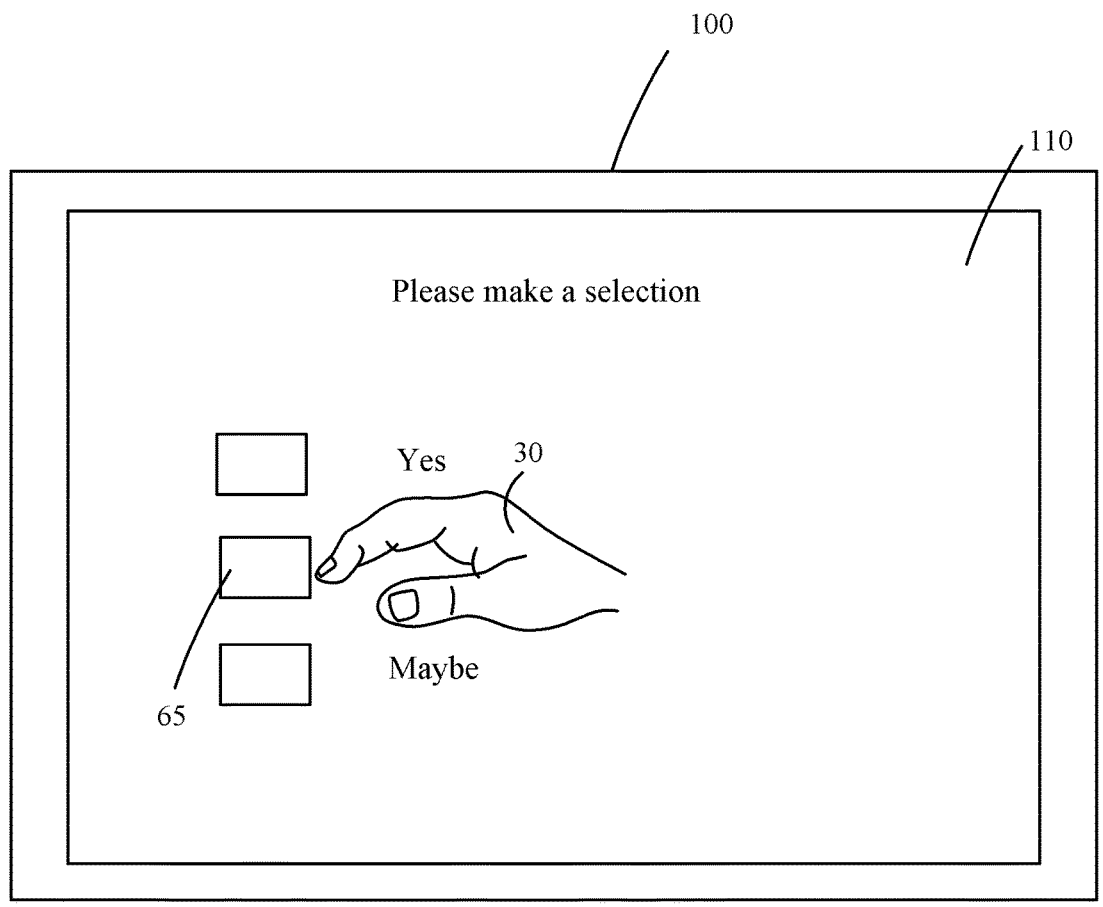
FIG. 1 is a schematic of a touch sensitive display with the touch sensitive surface implementing a low QoS, according to one implementation.

Implementations disclosed herein provide systems, devices, and methods for dynamically controlling the quality of service (QoS) of the touch sensing implementation depending on contextual factors. Aspects of the QoS that may be controlled include the report rate and positional accuracy and resolution of the touch event, among other aspects. For example, in one aspect, the system can identify whether user input is being made using a human finger or a stylus. Due to the relatively large cross-section of a user's finger, finger input on a touch screen may be used for coarse operations, such as single selections or pinch or zoom gestures. Such finger-based use cases may be accomplished with low QoS (i.e., lower resolution sensing and scan rates). However, touch screen input via a stylus requires high QoS, (i.e., higher resolution and scan rates) in order to capture fine user movements, such as on-screen drawing, calligraphy, handwriting, or signature input in a faithful way. In particular, signature capture and verification requires high QoS in order to accurately verify a user's signature in a repeatable way.

Existing touch sensing implementations that support stylus input typically function in high QoS mode even when the current application relies only on coarser methods of user input, such as a user's finger. Accordingly, one aspect relates to a touch screen system that adjusts the scan rate and/or resolution of input capture on the touch sensitive surface depending on the current application. This dynamic adjustment of the QoS of the touch screen can provide an optimal user experience along with improved battery life of the device through improved energy efficiency.

Another aspect is a system that adjusts the touch sensitive surface scan rate and resolution for different regions of interest on the sensor, depending on how the regions are being used by the active application. For example, a region of the touch screen where a signature is entered may require a high scan rate and resolution to accurately capture the movement of a stylus on a screen. A different region may require lower scan rates and resolution to capture input for an on-screen control object, such as a checkbox or a button. This implementation may lead to higher overall quality of service and improved energy efficiency due to the smaller high rate scan area. In some aspects, some regions may have zero QoS if no touch input is expected in those regions. This also may increase energy efficiency as a smaller area will be scanned in comparison to an approach in which a static QoS mode is applied to the entire sensor. In some aspects, sensitivity may be defined as the ability of the touch sensing implementation to track and resolve fine movements of a fine tipped stylus. For example, a higher position update rate and/or finer position resolution may be required to accurately capture movement of a stylus on a touch sensitive surface. A lower position update rate and/or finer position resolution may be sufficient to accurately capture user input on a touch sensitive surface, such as selecting a displayed checkbox or tapping against a soft button control exercised by, for example, a user's finger.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Device Overview

Embodiments of the invention relate to touch-sensitive devices configured to dynamically modify the characteristic properties of touch-sensing implementations such as report rate and resolution by changing the quality of service (QoS) of the touch sensitive surface depending on contextual factors. These contextual factors may include the expected QoS and regions-of-interest of the touch sensitive surface, based on the expected usage of the device for a given application.

In one embodiment, different regions may have different scan rates and resolutions depending on the expected user input. For example, one area of the touch sensitive display may ask for a user to provide input by selecting a button with a finger. In this area, a low QoS may be provided through a lower scan rate and resolution applied to that area of the touch sensitive surface.

In another example, one area of the touch sensitive display may ask for a user to provide input using a stylus or other fine-tipped instrument. This may occur, for example, in applications in which a user enters a signature, or in which handwriting analysis or verification occurs. In this area, a high level of QoS is provided in order to capture the details of the handwriting. A higher scan rate and resolution is applied to that area of the touch sensitive surface in order to provide the higher level of QoS required by the application.

One embodiment of a touch sensitive display device, incorporating either an integrated or overlaid touch sensitive surface, configured to accept user input from a user's finger is shown in FIG. 1. The touch sensitive display device 100 is configured to display information to the user and accept a user's input via a finger or other coarse method of entry. The touch sensitive device has a touch sensing surface 110 that can accept user input. In the illustrated embodiment, the current application asks the user to provide input by selecting a checkbox 65 or touching a specific area of the screen. For example, the checkbox 65 may be selected by the user's finger 30. In this embodiment, the contextual information provided by the current application directs the touch sensitive surface to run in a low QoS or quality of service mode. As shown, the touch sensitive surface may utilize a lower scan rate over the entirety of the touch sensitive surface, due to the coarse method of user input. For example, in the illustrated embodiment, the position update rate may be less than 60 Hz for a display that is refreshed 60 times a second. A low QoS mode may be used when the method of user input is a coarse or simple method, such as accepting user input from a user's finger. The application currently running on a host processor connected to the touch sensitive device can dynamically change the QoS mode of the touch sensitive device in order to improve energy consumption. In the embodiment shown in FIG. 1, the host processor has directed the touch sensitive device to operate in a low QoS mode given the expected user input for the currently running application.

Figure 2:
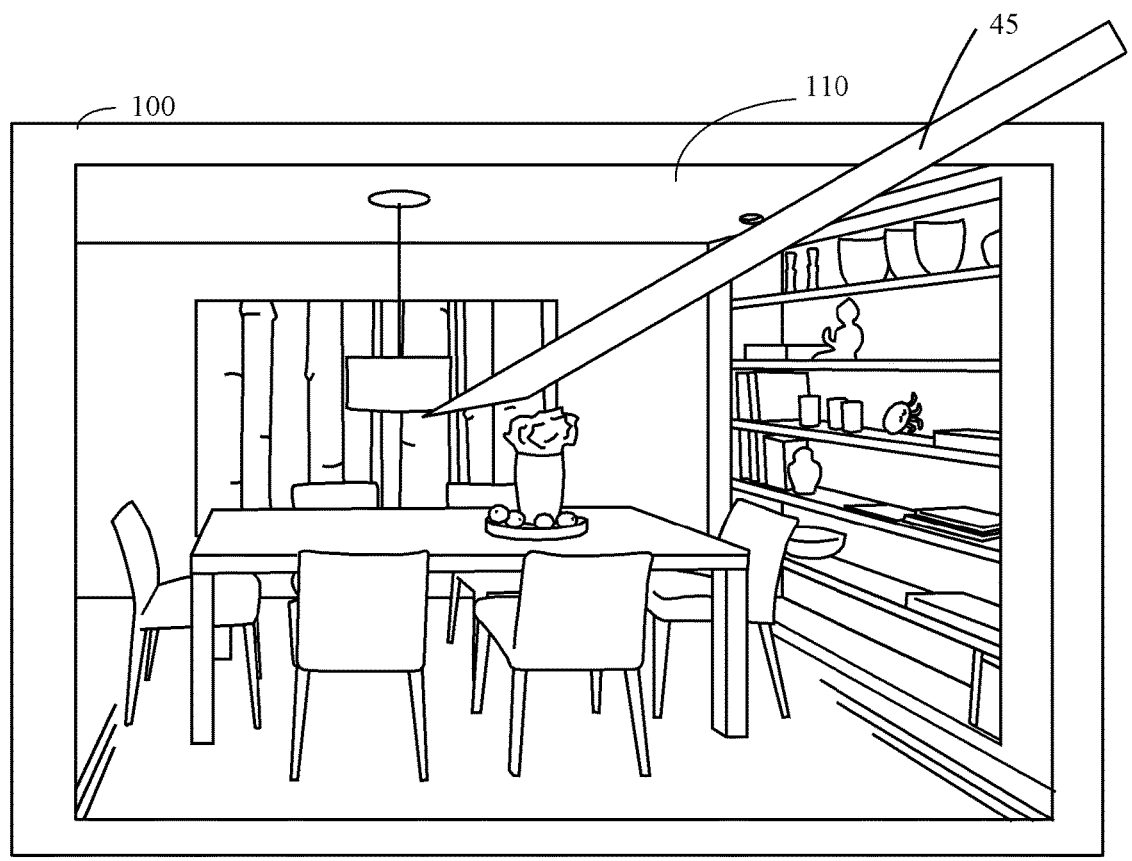
FIG. 2 is a schematic of a touch sensitive display with the touch sensitive surface implementing a high QoS, according to one implementation.

In FIG. 2, user input to the touch sensitive device 100 via a stylus 45 is expected, based on the currently running application. In this scenario, the host processor may direct the touch sensitive display 100 to operate in a high QoS mode in order to capture the fine and/or detailed movements of the stylus or other fine-tipped user input device. As shown, the touch sensitive surface may utilize a higher scan rate over the entirety of the touch sensitive surface, due to the fine-tipped method of user input or the expected detail of the user input. For example, the scan rate may be greater than 240 Hz. The stylus 45 may be used to create a drawing on the touch sensitive surface 110, such as the drawing 67, or may be used to provide other detailed input. As shown in FIG. 2, in this embodiment, the entire surface of the touch sensitive surface may operate in a high QoS mode in order to capture the detailed user input made with a more fine-tipped instrument. High QoS mode of operation is maintained until the application requesting the mode is inactive. After the application is exited or is moved to background, the touch sensing implementation will return to low QoS mode.

Figure 3:
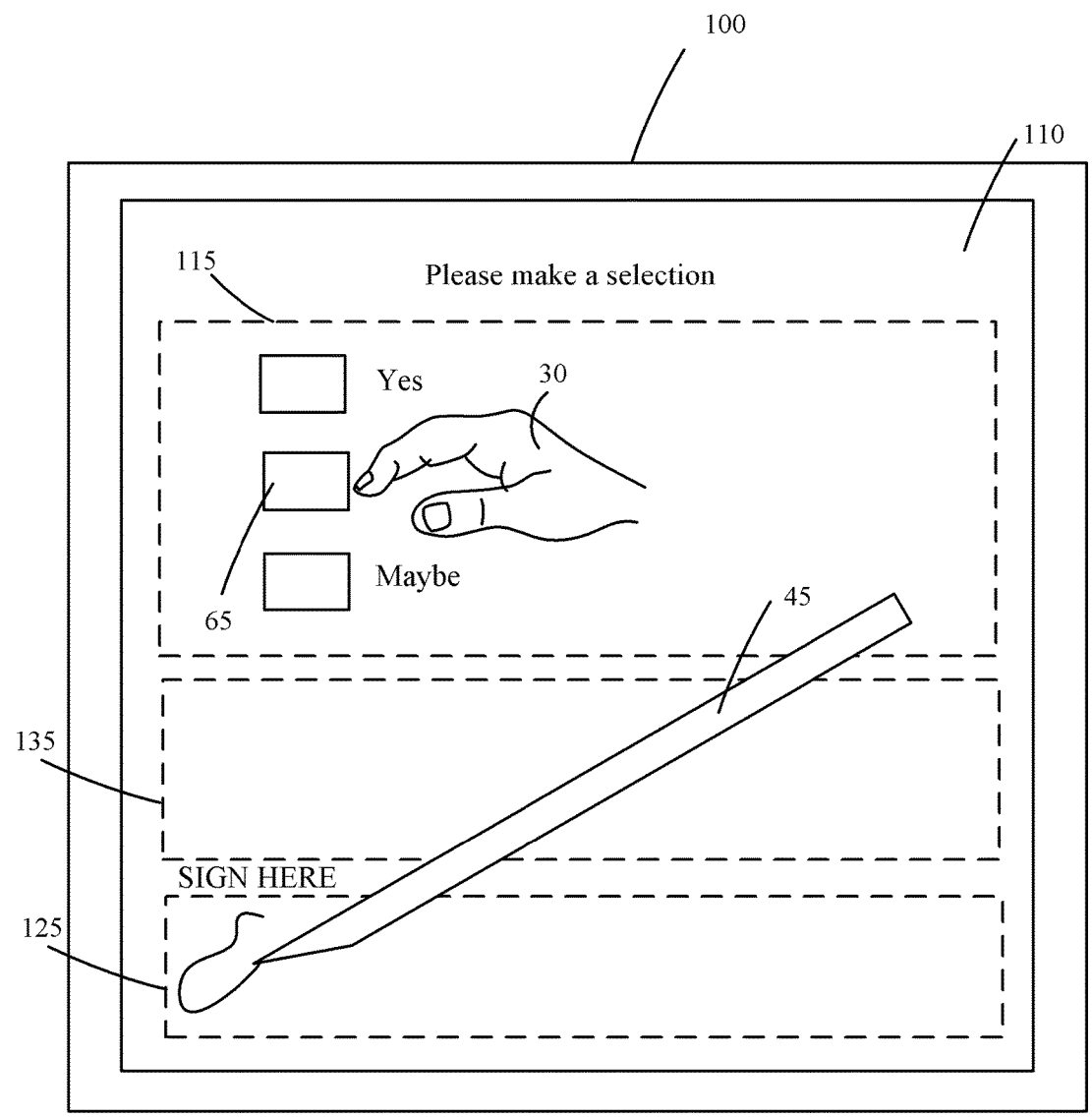
FIG. 3 is a schematic of a touch sensitive display with the touch sensitive surface having different regions of granular QoS, according to one implementation.

FIG. 3 illustrates one embodiment of a touch sensitive display device 100 configured to display information to a user and accept user input from a finger, stylus, or other input means. In the illustrated embodiment, a user can provide input to the touch sensitive display device 100 by using their finger to make gestures (such as single or double taps or swipe movements) or by using a stylus or other fine-tipped device.

As shown in FIG. 3, the touch sensitive display device 100 has a touch sensing surface 110. This surface may be divided into multiple regions or areas. A different scan rate or QoS may be applied to each region depending on the expected user input. Each rectangular input region can be defined by a pair of Cartesian coordinates representing diametrically opposite points of the region, expressed in the coordinate system used by the display device 100. Additionally, a third dimension can be used to define a rectangular cuboid for touch sensing systems that support contactless or proximity mode of operation. For example, a coarse input region 115 may be defined on the touch sensitive surface 110 using coordinate pair $(x_1, y_1)$ and $(x_2, y_2)$ to accept user input made with a finger or other coarse input means. Such input may include but is not limited to, selecting a checkbox or pressing a general area of the touch sensitive surface 110. The host processor may direct the touch sensing implementation to apply a low scan rate to the defined coarse input region 115, depending on the expected user input and the current application. In this implementation, the lower scan rate and resolution applied to one or more areas of the touch sensitive surface 110 would decrease the power consumption of the touch sensitive device 100, thus increasing battery life.

A fine input region 125 may be defined on the touch sensitive surface 110 using coordinate pair $(x_3, y_3)$ and $(x_4, y_4)$ to accept user input made with a stylus or other fine-tipped input means. This area may be used to accept input such as a signature, drawing, or other user input in which detailed movements are preferably captured. The host processor may direct the touch sensing implementation to apply a high scan rate to the defined fine input region 125 on touch sensitive surface 110 and operate in a high QoS mode, depending on the expected user input and the current application. In this implementation, the higher scan rate and resolution (<1 mm) would be applied to defined regions of the touch sensitive surface 110 and not globally applied. Furthermore, the host processor may direct the touch sensitive surface 110 to transition from a high QoS mode to a low QoS mode when the current application no longer requires data from the fine input region 125 or there is no input tool (finger or stylus) present in the region. In some embodiments, the touch sensitive surface 110 may only operate in a high QoS mode when needed by the current application. This dynamic QoS mode adjustment may save energy and increase the battery life of the touch sensitive device.

An additional region 135 may be defined on the touch sensitive surface 110 using coordinate pair $(x_5, y_5)$ and $(x_6, y_6)$ in which user input is not expected. In this region or other similarly defined regions, the touch sensitive surface omits scanning such regions, allowing some implementations to provide higher QoS by virtue of smaller scanned sensor areas in comparison to implementations in which the entire area of the touch sensitive surface is scanned. Additionally, battery life may be improved when only a partial area of the touch sensitive surface is scanned for user input.

System Overview

Figure 4:
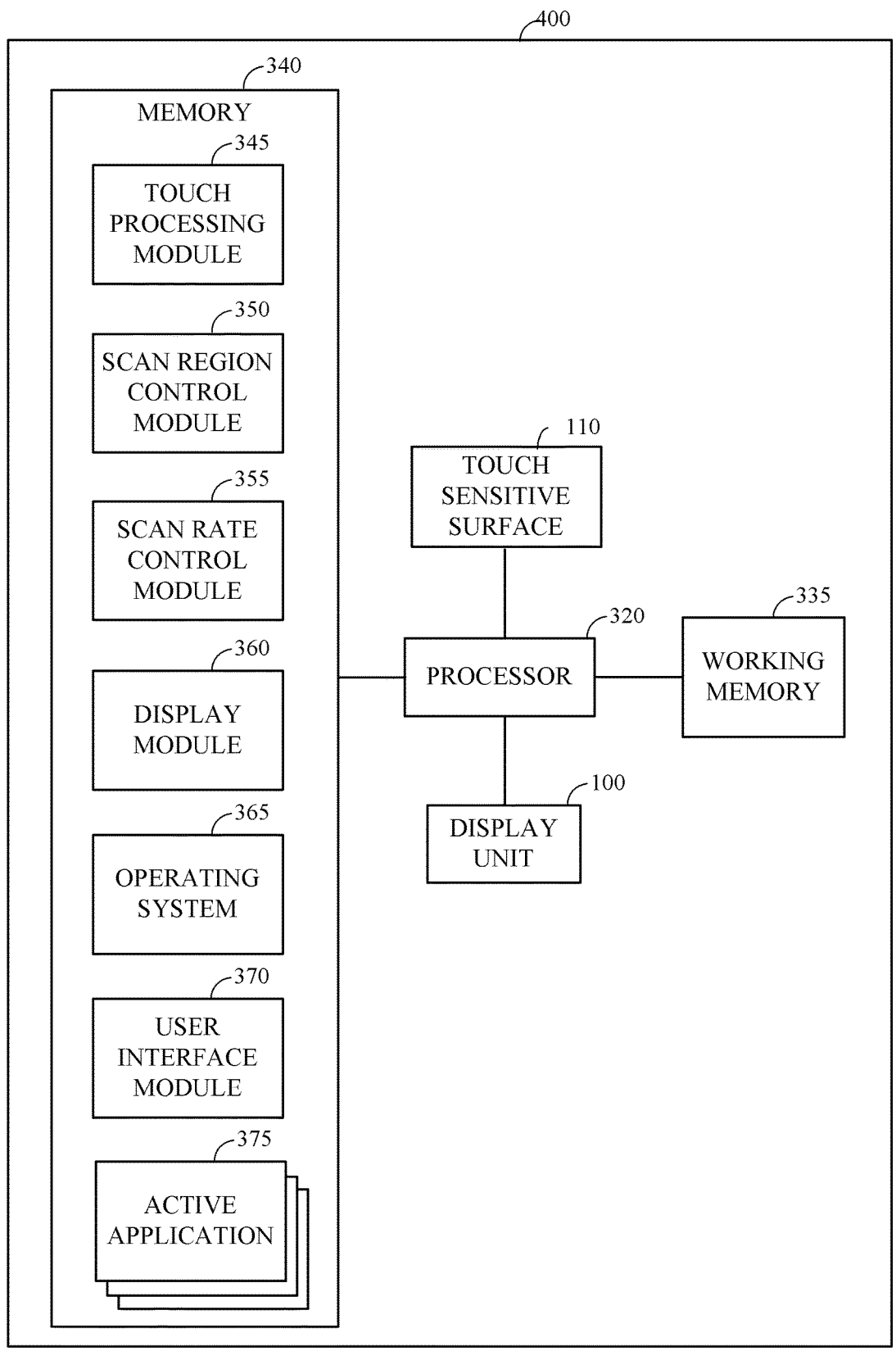
FIG. 4 is a schematic block diagram depicting a touch sensitive display system implementing some operative elements.

FIG. 4 illustrates one implementation of a touch sensitive display system 400 capable of dynamically adjusting the QoS or operating mode of the touch sensing implementation in real-time, based on contextual information. The illustrated embodiment is not meant to be limitative and the system 400 may include a variety of other components as required for other functions.

The touch sensitive display system 400 may include a touch sensitive surface 110 and a touch sensitive display unit 100. Certain embodiments of display unit 100 may be any flat panel display technology, such as an LED, LCD, plasma, or projection screen. Display unit 100 may be coupled to the processor 320 for receiving information for visual display to a user. Such information may include, but is not limited to, visual representations of files stored in a memory location, software applications installed on the processor 320, user interfaces, and network-accessible content objects.

Touch sensitive surface 110 may employ one or a combination of many touch sensing technologies, for instance capacitive, resistive, surface acoustic wave, or optical touch sensing. The touch sensing technology may support multi-touch gestures. In some embodiments, touch sensitive surface 110 may overlay or be positioned over display 100 such that visibility of the display 100 is not impaired. In other embodiments, the touch sensitive surface 110 and display 100 may be tightly integrated into a single panel, module or a surface. The touch sensitive surface 110 may be configured to align with display 100 such that a user touch on the touch sensitive surface 110 associated with a portion of the content displayed on display unit 100 produces an output coordinate in the coordinate system used by display unit 100 to place content across the visual area of the display unit 100.

The touch sensitive display system 400 can further include a processor 320 linked to the touch sensitive surface 110. A working memory 335 electronic display 100, and program memory 340 are also in communication with processor 320. The touch sensitive display system 400 may be a stationary device such as a desktop personal computer or it may be a mobile device, such as a tablet, laptop computer, or cellular telephone.

Processor 320 may be a general purpose processing unit. As shown, the processor 320 is connected to program memory 340 and a working memory 335. In the illustrated embodiment, the program memory 340 stores a touch processing/detection module 345, a scan region control module 350, a scan rate control module 355, a display module 360, operating system 365, and a user interface module 370. These modules may include instructions that configure the processor 320 to perform various touch sensing and device management tasks. Program memory 340 can be any suitable computer-readable storage medium, such as a non-transitory storage medium. Working memory 335 may be used by processor 320 to store a working set of processor instructions contained in the modules of memory 340. Alternatively, working memory 335 may also be used by processor 320 to store dynamic data created during the operation of touch sensitive display system 400.

The processor 320 may, in some embodiments, include instructions that when executed act as a touch screen controller (TSC) providing equivalent functionality. The specific type of TSC functionality employed will depend upon the type of touch technology used in touch sensitive surface 110. The processor 320 may be configured to start up when the touch detection module 345 indicates that a user has touched touch sensitive surface 110 and to power down after release of the touch. This feature may be useful for power conservation in battery-powered devices such as the touch sensitive device 400.

Memory 340 also contains user interface module 370. The user interface module 370 includes instructions that configure the processor 320 to provide a collection of on-display objects and soft controls that allow the user to interact with the device. The user interface module 370 also allows applications to interact with the rest of the system in a uniform, abstracted way. Operating system 365 configures the processor 320 to manage the memory and processing resources of system 400. For example, operating system 365 may include device drivers to manage hardware resources such as the electronic display 100 or touch sensitive surface 110. Therefore, in some embodiments, instructions contained in the scan region control module 350 and scan rate control module 355 discussed later may not interact with these hardware resources directly, but instead interact through standard subroutines or APIs located in operating system 365. Instructions within operating system 365 may then interact directly with these hardware components.

As mentioned earlier, the processor 320 is configured by several modules stored in the program memory 340. The touch processing module 345 can comprise computer-implemented instructions that configure the processor 320 to analyze low level data from discrete elements that comprise the touch sensitive surface 110 to detect and track stimuli in the form of a human finger or a stylus. The touch processing module 345 can also calculate the position of each the stimulus on the touch sensitive surface 110 and report the coordinates for a center-of-mass of the tracked stimuli using the coordinate system used by the display unit 100 along with a unique ID to disambiguate coordinates for every stimulus between successive periodic position updates. Touch processing module 345 has the ability to provide necessary state maintenance events for each tracked stimulus to end user applications. Touch processing module 345 also performs low-level control and management of discrete sensing elements that comprise touch sensitive surface 110 via scan region control module 350 and scan rate control module 355. It has innate knowledge of the physical mapping between the display visual area and the discrete sensors overlaying specific regions of the visual area. Therefore, processor 320, along with touch processing module 345 and display 100, represent one means for acquiring user touch input on a display unit and mapping rectangular regions specified by a pair of Cartesian coordinates in the coordinate system used by the display unit 100 to a group of discrete sensors of the touch sensitive surface 110 that can be used to detect touch in the region.

Memory 340 further includes a collection of end user applications 375 that interact with a user providing end-to-end functionality. In full screen mode, a single application may be receiving user input from the touch sensing surface and producing visual output on the entire visual area on display unit. In this embodiment, the expected QoS is defined by the only active application. The active application may still decide to define several regions contained within the visual area of the touch sensitive surface 110 to have different QoS requirements. In another embodiment, when multiple applications are using different, non-overlapped regions of the touch sensitive surface 110, several different regions with different QoS requirements can result. Every application, active or resident, may advertise context information (number of regions, desired QoS per region, finger or stylus based input, etc.). Context information for each region is remembered and dynamically managed by the user interface module 370. To ensure backward compatibility, legacy applications which may not provide context information may be assigned a well-known statically defined default context having a fixed pre-determined QoS.

When an application transitions from a resident, or inactive, state to an active state, the user interface module 370 activates the default or specified context information associated with the application and advertises it to the touch processing module 345. Note that an active application may adjust the context information dynamically as needed as long as the application is active. Touch processing module 345 decomposes context information into a more usable format. For example, touch processing module 345 converts a region description specified by a coordinate pair to a group of discrete sensing elements that need to be sensed to cover the region. The touch processing implementation then uses scan region control module 350 and scan rate control module 355 to achieve the desired QoS.

The scan rate control module 355 includes instructions that configure the processor 320 to apply a scan rate to the identified scan region depending on the data input requirements of the current application. Therefore, processor 320, along with scan region control module 350 and scan rate control module 355, represent one means for dynamically applying a scan rate to a defined scan region depending on the current application or other contextual information. The scan region control module 350 includes instructions that configure the processor 320 to determine a region of the touch sensitive surface 110 to be scanned depending on the current application. Therefore, processor 320, along with scan region control module 350, represent one means for determining and applying a scan region to a touch sensitive surface 110.

The touch sensitive display system 400 can be implemented on a mobile device, including a mobile phone or smartphone, a tablet computer, a laptop computer, a digital camera, or the like. By integrating the processor 320, memory 340, touch sensitive surface 110, and electronic display 100 on a mobile device, the touch sensitive display system 400 can be advantageously used without requiring the system to remain in a fixed location. In other implementations, however, the touch sensitive display system 400 can comprise a desktop computer, server, computer workstation, or other type of computing device. The touch sensitive display system 400 can be integrated with the computer hardware or the touch sensitive display system can be separate from the computing device.

Although FIG. 4 depicts a system comprising separate components including a processor, a touch sensitive surface, an electronic display, and memory, one skilled in the art would recognize that these separate components may be combined a variety of ways to achieve particular design objectives. For example, in an alternative embodiment, the memory components may be combined with processor components to save cost and improve performance.

Additionally, although FIG. 4 illustrates two memory components, including memory component 340 comprising several modules and a separate memory 335 comprising a working memory, one with skill in the art would recognize several embodiments utilizing different memory architectures. For example, a design may utilize ROM, static or dynamic RAM or programmable FLASH memory for the storage of processor instructions implementing the modules contained in memory 340. Alternatively, processor instructions may be read at system startup from a disk storage device that is integrated into touch sensitive display system 400 or connected via an external device port. The processor instructions may then be loaded into RAM to facilitate execution by the processor. For example, working memory 335 may be a RAM memory, with instructions loaded into working memory 335 before execution by the processor 320.

Method Overview

Figure 5:
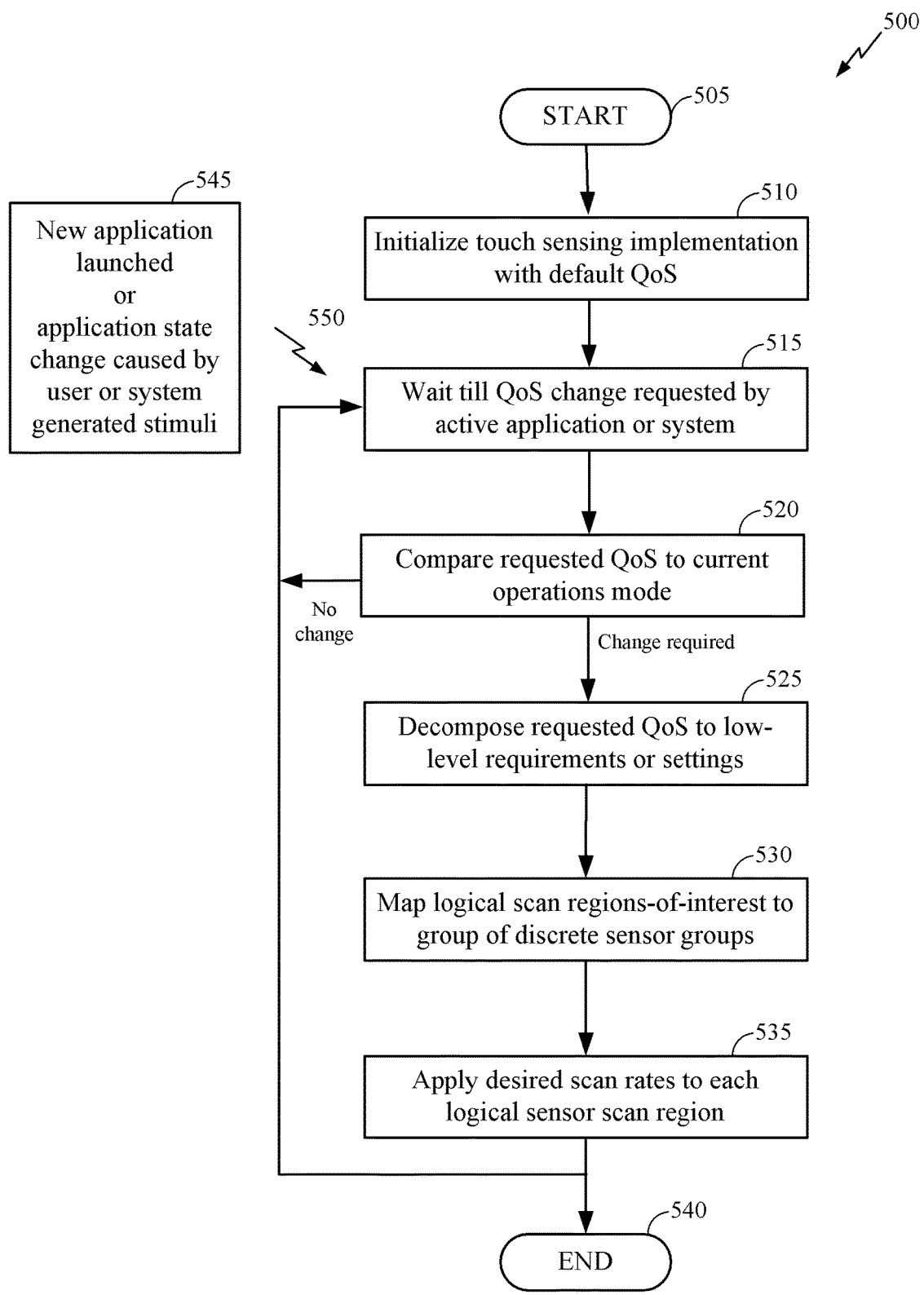
FIG. 5 is a flow chart depicting a process to dynamically modify the function of a touch sensitive device based on contextual information, according to one embodiment.

FIG. 5 illustrates one embodiment of a process 500 that may be used to improve touch sensitive surface data processing. The illustrated process may be executed by a system incorporating the touch sensitive display and host processor described above with respect to FIGS. 3 and 4.

The process 500 begins at start block 505 and transitions to block 510 where the touch sensing implementation is initialized during system start-up with a static default QoS. After initializing the touch sensing implementation, the process transitions to block 515 and waits for a request to change the QoS. Such a request may be caused by a system or user generated stimuli which in turn cause a new application to launch, or the state change of a current application or a dormant application to become current. The list of example events above is not exhaustive. Triggered by such events, when an application incorporating touch sensitive surface input requests a QoS change, depicted by event 550 in FIG. 5, process 500 transitions to block 520 wherein the requested QoS is compared to the current QoS that the touch sensing system is programmed to deliver. If it is determined that no change is needed to change the current QoS to the requested QoS, no action is taken and process 500 transitions back to block 515.

However, if a change is needed, process 500 transitions to block 525, where a new QoS is decomposed to more granular low-level requirements or settings. In some embodiments, as discussed above and discussed in greater detail below, some regions of the touch sensitive surface may require a high scan rate and resolution due to the nature of the expected user input. Other regions of the touch sensitive surface may not require a high scan rate and resolution.

After the application QoS requirements have been decomposed, process 500 transitions to block 530 wherein the touch sensitive surface scan regions-of-interest are determined and mapped to discrete sensor groups. In some embodiments, the touch sensitive surface may comprise one, two, three, or more logical regions-of-interest. Once these regions-of-interest have been determined, process 500 transitions to block 535 wherein the necessary scan rate is applied to each determined logical sensor scan region-of-interest. In some embodiments, each region may be scanned at a different rate or resolution. In some embodiments, some regions of the touch sensitive surface may not be scanned if no user input is expected in those regions.

After applying the necessary scan rate to each region based on the application data input requirements, process 500 transitions to block 515 and waits for the next QoS request change event 550. As described earlier, such a change can be caused application state change instigated either by user or system generated stimulus.

Process 500 as described above continues until the touch sensing implementation is implicitly or explicitly turned off when touch based user input is no longer required.

Examples

As discussed above with respect to FIG. 3, sensor regions-of-interest can be controlled at different levels of temporal granularity allowing dynamic QoS and energy optimization. In one embodiment, a high level operating system may activate both a signature block and confirmation input regions at the same time. In another embodiment, with greater fine-grained temporal granularity, the high level operating system may activate only the signature region first, followed by activation of the confirmation input region only after the signature has been successfully entered. This approach can be extended by the high level operating system to dynamically update regions-of-interest of the touch sensitive surface for moving stimulus based on calculated or projected position, speed, and acceleration of the stimulus at a desired level of timing granularity. Such implementations may be useful, for example, in high-end gaming applications, as these applications can utilize higher QoS from the same hardware while having similar energy usage and battery life as present-day implementations.

Additionally, the high level operating system may be able to improve the energy efficiency of the touch sensitive device based on other usage modalities. For example, in a wake-up-from-touch scenario in which the device can be awakened from stand-by or deep sleep by a touch on the touch sensitive surface, specifying a sequence of regions-of-interest on the touch sensitive surface based on custom-defined movement patterns by the user can reduce energy consumption. A pattern of movement or touch may be made unique to each user and may be used for authentication. The wake-up process can be made more secure by adding an authentication step involving fingerprint recognition and verification via the touch sensitive surface in a customizable region-of-interest on the sensor.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A touch-sensitive display system for an electronic device, comprising:
   a touch-sensitive display comprising a touch-sensitive surface; and
   a control module configured to:
   receive contextual information from an application during at least an initialization of the application and a state change of the application;
   determine a plurality of regions based on contextual information from the application, the plurality of regions being mapped to the touch-sensitive surface;
   determine an expected touch screen input method for each of the plurality of regions based on the contextual information, the expected touch screen input method being one of a coarse input method and a fine input method; and
   adjust one or more of a scanning sensitivity and a resolution sensitivity for each of the plurality of regions of the touch-sensitive surface based on the expected touch screen input method such that the accuracy and Quality of Service (QoS) of the touch-sensitive display for the fine input method is higher than the accuracy and QoS of the touch-sensitive display for the coarse input method.

2. The system of claim 1, wherein the expected touch screen input method is one of an average human finger and a stylus.

3. The system of claim 1, wherein the control module is further configured to partition the touch-sensitive display into an active region and an inactive region.

4. The system of claim 3, wherein the active region is dynamically updated.

5. The system of claim 3, wherein the control module is further configured to not scan the inactive region of the touch-sensitive display.

6. The system of claim 1, wherein the expected input region depends on a usage mode of the electronic device.

7. The system of claim 1, wherein the sensitivity of a portion of the touch-sensitive surface including the expected input region is adjusted and the sensitivity of another portion of the touch-sensitive surface is not adjusted.

8. The system of claim 1, further comprising a memory unit, wherein the memory unit is configured to store contextual information, and wherein the control module is further configured to assign the stored contextual information to a legacy application that does not provide its own context information.

9. A method for improving the energy efficiency of touch-sensing devices, comprising:
   receiving contextual information from an application during at least an initialization of the application and a state change of the application;
   determining a plurality of regions based on contextual information from the application, the plurality of regions being mapped to the touch-sensitive surface;
   determining an expected touch screen input method for each of the plurality of regions based on the contextual information, the expected touch screen input method being one of a coarse input method and a fine input method; and
   dynamically adjusting one or more of a scanning sensitivity and a resolution sensitivity for each of the plurality of regions of the touch-sensitive surface based on the expected touch screen input method such that the accuracy and Quality of Service (QoS) of the touch-sensing device for the fine input method is higher than the accuracy and Quality of Service (QoS) of the touch-sensing device for the coarse input method.

10. The method of claim 9, wherein the expected touch screen input method is one of an average human finger and a stylus.

11. The method of claim 9, wherein adjusting a sensitivity of a touch sensitive surface may be performed at different regions of interest on the touch-sensing device.

12. A non-transitory computer-readable medium comprising instructions that, when executed, causes a processor to perform the method of:
- receiving contextual information from an application during at least an initialization of the application and a state change of the application;
- determining a plurality of regions based on contextual information from the application, the plurality of regions being mapped to the touch-sensitive surface;
- determining an expected touch screen input method for each of the plurality of regions based on the contextual information, the expected touch screen input method being one of a coarse input method and a fine input method; and
- dynamically adjusting one or more of a scanning sensitivity and a resolution sensitivity for each of the plurality of regions of the touch-sensitive surface based on the expected touch screen input method such that the accuracy and Quality of Service (QoS) of the touch sensitive surface for the fine input method is higher than the accuracy and Quality of Service (QoS) of the touch sensitive surface for the coarse input method.

13. The non-transitory computer-readable medium of claim 12, further comprising determining an active region and an inactive region of a touch-sensitive device.

14. The non-transitory computer-readable medium of claim 13, further comprising adjusting a sensitivity applied to the active region and the inactive region of the touch-sensitive device.

15. The non-transitory computer-readable medium of claim 14, wherein the inactive region of the touch-sensitive device is not scanned.

16. The non-transitory computer-readable medium of claim 12, wherein the expected touch screen input method is one of an average human finger and a stylus.

17. An apparatus for energy efficient touch processing, comprising:
- a touch-sensitive display comprising a touch-sensitive surface;
- means for receiving contextual information from an application during at least an initialization of the application and a state change of the application;
- means for determining a plurality of regions based on contextual information from the application, the plurality of regions being mapped to the touch-sensitive surface;
- means for determining an expected touch screen input method for each of the plurality of regions based on the contextual information, the expected touch screen input method being one of a coarse input method and a fine input method; and
- means for adjusting one or more of a scanning sensitivity and a resolution sensitivity for each of the plurality of regions of the touch-sensitive surface based on the expected touch screen input method such that the accuracy and Quality of Service (QoS) of the touch-sensitive display for the fine input method is higher than the accuracy and Quality of Service (QoS) of the touch-sensitive display for the coarse input method.

* * * * *